United States Patent [19]

Perreault

[11] 4,273,829

[45] Jun. 16, 1981

[54] INSULATION SYSTEM FOR WIRE AND CABLE

[75] Inventor: Aimé J. Perreault, South Burlington, Vt.

[73] Assignee: Champlain Cable Corporation, Wilmington, Del.

[21] Appl. No.: 71,205

[22] Filed: Aug. 30, 1979

[51] Int. Cl.³ ........................ B32B 15/08; H01B 7/04; H01B 7/18; B32B 27/30

[52] U.S. Cl. ................................ 428/383; 174/110 N; 174/110 V; 174/110 FC; 174/110 SR; 174/120 SR; 428/379; 428/421; 428/422; 428/463; 428/520; 428/522

[58] Field of Search ............... 428/383, 379, 520, 522, 428/422, 421, 463, 473.5; 174/120 SR, 110 SR, 110 V, 110 N, 110 FC

[56] References Cited

U.S. PATENT DOCUMENTS

| | | | |
|---|---|---|---|
| 3,168,417 | 2/1965 | Smith | 174/120 R |
| 3,408,453 | 10/1968 | Shelton | 428/421 |
| 3,422,215 | 1/1969 | Humes | 174/120 R |
| 3,504,103 | 3/1970 | Anderson | 174/120 R |
| 3,616,177 | 10/1971 | Gumerman | 428/216 |
| 3,676,566 | 7/1972 | McBride | 174/120 R |
| 3,684,646 | 8/1972 | Kreuz | 428/421 |
| 4,184,001 | 1/1980 | Hildreth | 428/383 |

FOREIGN PATENT DOCUMENTS

| | | | |
|---|---|---|---|
| 2053960 | 5/1972 | Fed. Rep. of Germany | 174/120 SR |
| 1039967 | 8/1966 | United Kingdom | 428/473.5 |

*Primary Examiner*—Ellis P. Robinson
*Attorney, Agent, or Firm*—Michael B. Keehan

[57] ABSTRACT

An insulated electrical conductor is provided that exhibits excellent physical, electrical and chemical protection for wire and cable and is particularly suitable for use in aircraft applications. The electrical conductor is insulated with (A) a film selected from ethylene tetrafluoroethylene copolymer film and fluorinated ethylene-propylene (FEP) copolymer coated polyimide film and (B) a topcoat insulation system comprising (a) a first layer of polyimide, (b) a second layer of polyvinylidene fluoride, and (c) a third layer of crosslinked acrylic polymer.

5 Claims, 2 Drawing Figures

INSULATION SYSTEM FOR WIRE AND CABLE

FIELD AND STATEMENT OF THE INVENTION

Figure 1:
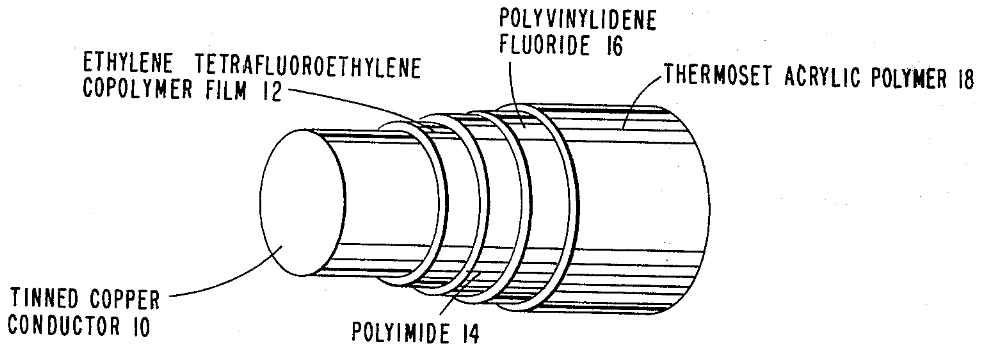

This invention relates to an insulation system for wire and cable employing tinned, silver or nickel coated electrical conductors having properties suitable for use in aircraft applications.

More particularly, this invention relates to an electrical conductor insulated with (A) a film selected from ethylene tetrafluoroethylene copolymer film and fluorinated ethylene-propylene (FEP) copolymer coated polyimide film and (B) a topcoat insulation system comprising (a) a first layer consisting essentially of modified polyimide, (b) a second layer consisting essentially of polyvinylidene fluoride, and (c) a third layer consisting essentially of cross-linked acrylic polymer.

THE PRIOR ART

U.S. Pat. No. 3,168,417, R. E. Smith and John M. Gardner, inventors, describes an improved insulation system for electrical conductors in which the electrical conductors are coated with a fluorocarbon polymer which in turn is insulated with a polyimide containing the imide linkage as part of a 5- or 6-membered heterocyclic ring.

U.S. Pat. No. 3,408,453, Charles F. Shelton, Jr., inventor, describes an insulated conductor suitable for use at high temperatures without breakdown. The electrical conductor of U.S. Pat. No. 3,408,453 has a metallic conductor covered by a layer of polytetrafluoroethylene film. One surface of this film is covered with a heat-sealable fluorinated resin layer which does not contact the conductor. The heat-sealable layer is sealed to a heat and oxidation resistant preshrunk polyimide film coated on both sides by a first layer of polytetrafluoroethylene and a second layer of heat-sealable fluorinated resin.

U.S. Pat. No. 3,422,215, Karl R. Humes, inventor, describes an electrical cable having fused insulation applied to wire. The insulation system comprises a first layer of polytetrafluoroethylene or trifluoromonochloroethylene resin on the wire, which resin is readily strippable from the wire, a second layer of a polyimide or polyamideimide resin on the first layer, the second layer having at least one surface covered with a layer of fluorinated ethylene polymer, a third layer of material similar to the first layer and at least one of the first and third layers being bonded to the second layer by a fluorinated ethylene polymer resins layer.

U.S. Pat. No. 3,504,103, Paul L. Anderson et al, inventors, describes an improved multilayer electrical conductor assembly. The invention consists in providing an insulation system comprising a plurality of thin plastic insulating sheets, at least one of the sheets having a high dielectric constant and at least another of the sheets being characterized by good mechanical strength and resistance to penetration and also by high dielectric strength. Plastic films of polyvinyl fluoride are adhesively bonded to both sides of a film of polyethylene terephthalate to form an insulation laminate, the polyethylene terephthalate forming an interliner. The laminate is then adhesively secured between conductors.

U.S. Pat. No. 3,616,177, Carl Gumerman, inventor, describes a laminar structure of polyimides and a wire insulated therewith. The laminar structure described comprises at least three layers, including a base layer of a polyimide, a layer of a fluoroethylene propylene (FEP) copolymer and a layer of polytetrafluoroethylene (PTFE) polymeric material.

U.S. Pat. No. 3,676,566, Richard T. McBride, inventor, describes a multilayer composite useful as a shield for electrical conductors. The composite structure has adjacent polyimide/perfluorocarbon/metal layers.

DESCRIPTION OF THE INVENTION

The insulated electrical conductor of this invention is fully described in the specification and drawings which follow. In the drawings, FIGS. 1 and 2 are side views illustrating two embodiments of the insulated electrical conductor of this invention.

In FIG. 1 an electrical conductor 10 has an ethylene tetrafluoroethylene copolymer film 12 sealed about the exterior surface of conductor 10. The first layer 14 of the topcoat insulation system is polyimide coating which adheres to the surface of film 12. The second layer 16 of the topcoat insulation system is polyvinylidene fluoride which adheres to the first layer of insulation 14. The third layer 18 of the topcoat insulation system is thermosetting acrylic polymer which coats the second layer of insulation 16.

Figure 2:
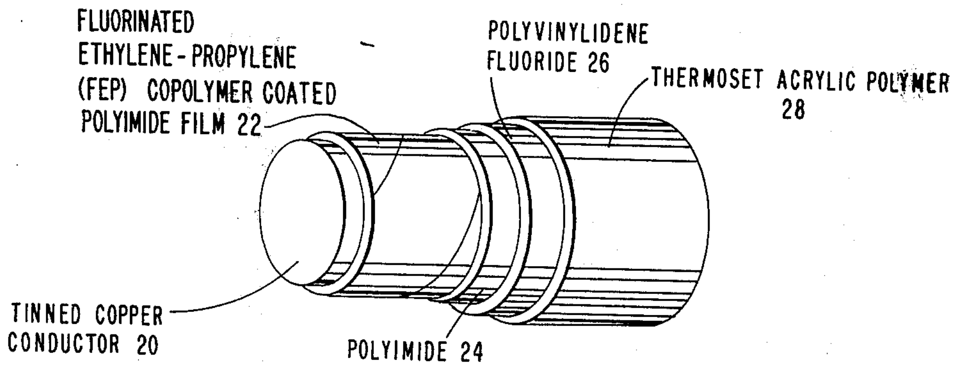

In FIG. 2. an electrical conductor 20 is wrapped with fluorinated ethylene-propylene (FEP) copolymer coated polyimide film 22 and heat sealed about the exterior surface of conductor 20. The first layer 24 of the topcoat insulation system is polyimide coating which adheres to the surface of film 22. The second layer 26 of the topcoat insulation system is polyvinylidene fluoride which adheres to the first layer of insulation 24. The third layer 28 of the topcoat insulation system is thermosetting acrylic polymer which adheres to the second layer of insulation 26.

The electrical conductors which can be employed include any of the well known metallic conductors used in wire and cable applications, stranded or unstranded. The metallic conductors are preferably tinned or silver or nickel coated conductors.

The film which can be employed to initially cover the metallic conductors is selected from fluorinated ethylene-propylene (FEP) copolymer coated polyimide film and ethylene tetrafluoroethylene copolymer film.

The fluorinated ethylene-propylene (FEP) copolymer coated polyimide film which can be employed is available commerically from E. I. du Pont de Nemours and Company (Inc.), Wilmington, Del. 19898, and is sold under the trade name Kapton polyimide film-type F. This film is heat sealed about the exterior surface of the conductor by heating the conductor after it has been wrapped with said film. Information concerning heat sealing of Kapton polyimide film-Type F is disclosed in DuPont Technical Information Bulletin H-110-63. Information on properties of Kapton polyimide film-Type F is contained in DuPont Bulletin F-66-1A, General Specification.

The ethylene tetrafluoroethylene copolymer film which can be employed to initially cover the electrical conductor is available commercially from E. I. du pont de Nemours and Company (Inc.), Wilmington, Del. 19898, and is sold under the trade name Tefzel ETFE fluoropolymer. This fluoropolymer is applied to the surface of electrical conductors by melt extrusion techniques. The Tefzel ETFE fluoropolymer coated conductor is radiation cured by exposure to 5–10 megarads of electron beam radiation. A particularly suitable Tefzel ETFE fluoropolymer for use in coating the electrical conductor is Tefzel 280. Information for melt extrusion of Tefzel ETFE fluoropolymers suitable for coating electrical conductors in preparation of the insulated conductors of this invention is disclosed in a publication by DuPont entitled "Tefzel", PIB #2 and dated Feb. 1, 1970. The thickness of the film coverings employed to cover the metallic conductor will vary depending upon the application for which the wire is being insulated.

The film covered conductors which can be employed with the topcoat insulation system of this invention are initially surface etched prior to application of the first layer of the topcoat insulation. Surface etching is accomplished by treating the surface of the film coated conductor with an etching agent such as lithium sodium or a solution of an alkali metal such as sodium or potassium metal in liquid ammonia, e.g., 1% of sodium or 10% sodium in liquid ammonia, or a solution, e.g., a 5% solution of sodium metal in molten naphthalene, sodium-naphthalene dissolved in tetrahydrofuran. Other etching agents that can be employed include alkaline earth metals, e.g., calcium, or magnesium or zinc, as shown in U.S. Pat. No. 2,789,065. Other materials capable of etching the film surface of the conductor can be employed. Etching is accomplished by passing the film covered wire through an ethcing bath for from a fraction of a second to several seconds. After application of the etching agent the etching agent remaining on the surface of the film should be neutralized. Neutralization can be accomplished by passing the etched film covered conductor through a solution of acetic acid or other mild acids, preferably admixed with carbon tetrachloride. Alternatively, the etched film covered conductor can be thoroughly washed with water to remove the etching agent.

The polyimides which form the first layer of the topcoat insulation system of this invention have (1) an aromatic ring, e.g., a benzene or a naphthalene ring system, and (2) the heterocyclic linkage comprising a five- or six-membered ring containing one or more nitrogen atoms and double-bonded carbon-to-carbon and/or carbon to nitrogen, and/or carbonyl groups. Preferably, there are essentially no aromatic carbon atoms with hydrogen atoms attached thereto. The linkage systems in the polyimides are, in general, capable of assuming resonant double bond configurations. These resins are, in general, linear polymers, but are extremely high melting by virtue of their high molecular weight and strong intermolecular attraction. Suitable polymeric imides which can be employed in the topcoat insulation system of this invention are disclosed in U.S. Pat. No. 3,168,417, said disclosure being incorporated herein by reference. Preferred polyimides which can be employed in the topcoat insulation system of this invention are polybenzimide made by condensing equal molar amounts of an aromatic hydrocarbon diamine with pyromellitic dianhydride and polybenzimidazoles. The first layer of insulation can vary in thickness depending upon use but for many aircraft applications the first layer of insulation is generally from about 0.07 mm to about 0.13 mm in thickness.

The polyimide is applied to the etched film coated electrical conductor as a solution in any convenient solvent such as formic acid, dimethyl sulfoxide, N-methyl-pyrrolidone, N-methyl caprolactam, dimethyl formamide, pyridine, p-cresol, m-p-cresol and the like. The film coated wire is passed through a die dip coat bath and then through a series of ovens to dry the film. The ovens are arranged in a vertical relationship to permit the wire to pass through while maintained in a vertical configuration to promote even application of the polyimide to the surface of the film coated conductor.

The polyvinylidene fluoride which comprises the second layer of the topcoat insulation system of this invention is a crystalline, high molecular weight thermoplastic polymer containing about 95% by weight fluorine. A preferred polyvinylidene fluoride polymer is sold by Pennwalt Corporation, Philadelphia, Pa. under the tradename KYNAR. The polyvinylidene fluoride polymer is applied to the polyimide coated conductor by a dip-coating technique. In this process the polyimide coated wire is passed through a conventional wet flow coating device commonly employed in the wire industry. The polyvinylidene fluoride coated wire then passed through drying and curing ovens. In a typical procedure the wire is passed through several ovens operated at about 250° F., 350° F. and 400° F. respectively. The wire passes through these heating zones while being maintained in a vertical plane. The linear speed of the polyvinylidene fluoride coated wire passing through the ovens is adjusted to insure complete drying of the polyvinylidene fluoride prior to its exiting from the last oven.

The polyvinylidene fluoride is employed as a dispersion in a diluent. Diluents for polyvinylidene fluoride which are compatible with the polyimide comprising the first layer of the topcoat insulation can be employed. Suitable diluents include ketones such as acetone, methylethyl ketone, isobutyl ketone, and aromatic solvents such as toluol and naphtha. A preferred diluent is a mixture comprising 95% by weight cellosolve acetate and 5% isophorone. The polyvinylidene dispersion preferably contains from about 15% to about 20% by weight of solids. The polyvinylidene solids can be pigmented with suitable inorganic pigments such as titanium dioxide, chrome yellow, cadmium red, cobalt green and violet, cerulean blue and the like. The polyvinylidene fluoride is applied to form a continuous layer of insulation which may vary in thickness but for many aircraft applications this layer is from about 0.07 mm to about 0.13 mm in thickness.

The third or exterior layer of the topcoat insulation system of this invention is a chemically crosslinked thermosetting acrylic polymer. The acrylic polymer is applied to the conductor having a first layer of polyimide and a second layer of polyvinylidene fluoride as defined above by passing the conductor having two layers of insulation, as heretofore described, through an aqueous acrylic emulsion in a bath, said emulsion comprising 10 to 12% by weight of acrylic solids. Suitable acrylic polymers which are thermosetting and can be prepared as aqueous emulsions are polymethyl methacrylate and copolymers prepared from methyl methacrylate and acrylic and methacrylic ester monomers or vinyl monomers such as alpha-methylstyrene and vinyl chloride. An acrylic polymer which is preferable for use as the third layer of the topcoat insulation system of this invention is available commercially under the tradename Rhoplex AC-172 from the Rohm and Haas Company, Philadelphia, Pa. 19105. A crosslinking agent for the acrylic polymer such as a methylated melamine is admixed with the emulsion. Any crosslinking agent for acrylic polymer can be employed. A particularly suitable crosslinking agent for acrylic emulsion is Cymel 385 available commercially from American Cyanamide Co., Resins Dept., Wayne, N.J. Cymel 385 is a methylated melamine.

The acrylic polymer is applied to the wire or cable having the first and second layers of insulation to a desired thickness depending on the application for the wire and is cured. For many aircraft applications the acrylic polymer insulation is from about 0.7 mm to about 0.13 mm in thickness.

The following examples illustrate this invention. In the examples and throughout this specification, percantages are by weight unless specified otherwise.

EXAMPLES 1-3

A fluorinated ethylene-propylene (FEP) copolymer coated polyimide film type-F is wrapped about the exterior of conductor wires having AWG sizes as specified in Table I. The polyimide film employed is Kapton polyimide film. The film is heat cured at about 585° F. for about 10 seconds.

The first layer of the topcoat insulation system is applied as follows. An aromatic polyimide which is a polybenzimide made by condensing equal molar amounts of an aromatic hydrocarbon diamine with pyromellitic dianhydride and sold by Du Pont under the trade name Pyre-ML is admixed in a normal methylpyrrolidone solvent. The solution contains 12–14% by weight of the aromatic polyimide. The solution of aromatic polyimide is charged to a die dipcoat applicator. Wire is passed through dies in the die dipcoat applicator a number of times as specified in Table I. The polyimide coated wire is cured by passing the wire through a series of drying ovens which are each five feet long and which are arranged adjacent to each other in a vertical configuration. Each oven is operated at the temperature specified in Table I.

The wire containing the first layer of topcoat insulation is then passed into a polyvinylidene fluoride dispersion in a dipcoat bath. The polyvinylidene fluoride is dispersed in a diluent comprising a mixture of cellosolve acetate (95% by weight) and isophorone (5% by weight). The dispersion comprises 15–20% by weight of polyvinylidene fluoride. After each pass through the dipcoat bath (wet passes) the wire is passed through a series of adjacent, vertical drying ovens. After the last pass is complete through the dipcoat bath and ovens, the wire is passed through the oven only to complete drying (dry passes). The number of passes and drying conditions are as specified in Table I.

The wire with the first and second layers of insulation is then passed to a third dipcoat bath containing emulsion of acrylic polymer in water. The emulsion contains a methylated melamine crosslinking agent dissolved therein. The wire is passed through the acrylic emulsion bath under conditions as specified in Table I. After each pass through the bath the wire is dried by passing through a series of adjacent vertical drying ovens. The wire emerging from the third dipcoat bath after drying is the insulated electrical conductor of this invention.

TABLE I

| Layer One-Topcoat Insulation (Polyimide) | | | |
|---|---|---|---|
| | Ex. 1 | Ex. 2 | Ex. 3 |
| Wire size AWG | 28–20 | 18–16 | 14–10 |
| Wire speed (feet per min.) | 17 | 14 | 9 |
| Passes through Die Dipcoat Applicator | | | |
| wet | 4 | 4 | 4 |
| dry | 1–2 | 1–2 | 1–2 |
| Drying Ovens (temperture °F.) | | | |
| #1 | 200 | 200 | 200 |
| #2 | 300 | 300 | 300 |
| #3 | 400 | 400 | 400 |
| #4 | 450 | 450 | 450 |
| Coating Thickness (inches) | 0.0005 | 0.0005 | 0.0005 |
| Layer Two-Topcoat Insulation (Polyvinylidene Fluoride) | | | |
| Wire speed (feet per min.) | 18 | 16 | 14 |
| Passes through Dipcoat Bath | 4 | 4 | 4 |
| Drying Ovens (temperature °F.) | | | |
| #1 | 200 | 200 | 200 |
| #2 | 300 | 300 | 300 |
| #3 | 390 | 390 | 390 |
| #4 | 390 | 390 | 390 |
| Coating Thickness (inches) | 0.0005 | 0.0005 | 0.0005 |
| Layer Three-Topcoat Insulation (Acrylic) | | | |
| Wire speed (feet per min.) | 18 | 16 | 14 |
| Passes through Dipcoat Bath | 3 | 3 | 3 |
| Drying Ovens (temperature °F.) | | | |
| #1 | 200 | 200 | 200 |
| #2 | 300 | 300 | 300 |
| #3 | 390 | 390 | 390 |
| #4 | 390 | 390 | 390 |
| Coating Thickness (inches) | 0.00075 | 0.00075 | 0.00075 |

The insulated electrical conductors of this invention can be used satisfactorily in applications in which the wire will be exposed to temperature extremes of from −65° C. to 150° C. The insulation has good chemical, abrasion and high temperature resistance. The second layer of the insulation system renders the insulation system capable of being pigmented for color coding purposes. The exterior surface of the insulation system provides anti-blocking resistance, abrasion and chemical alkali resistance and is capable of ink-jet printability. The insulated electrical conductor provides a unique combination of physical, electrical and chemical protection particularly desirable for use in aircraft applications.

What I claim and desire to protect by Letters Patent is:

1. An insulated electrical conductor comprising a metallic conductor insulated with (A) a film selected from ethylene tetrafluoroethylene copolymer and fluorinated ethylene-propylene (FEP) copolymer coated polyimide, and (B) a topcoat insulation system comprising a first layer of insulation consisting essentially of a high melting polyimide coating adhering to said film, a second layer of insulation consisting essentially of polyvinylidene fluoride coating adhering to the surface of the polyimide coating and a third layer of insulation consisting essentially of a crosslinked acrylic polymer coating adhering to the surface of the polyvinylidene fluoride.

2. The insulated electrical conductor of claim 1 in which the film insulating the metallic conductor is ethylene tetrafluoroethylene copolymer film.

3. The insulated electrical conductor of claim 1 in which the film insulating the metallic conductor is fluorinated ethylene-propylene (FEP) copolymer coated polyimide film.

4. The insulated electrical conductor of claims 1, 2 or 3 in which the polyimide coating is prepared from a polybenzimide made by condensing equal molar amounts of an aromatic hydrocarbon diamine with pyromellitic dianhydride.

5. The insulated electrical conductor of claims 1, 2 or 3 in which the polyimide is polybenzimidazole.

* * * * *